United States Patent
Edwards et al.

(10) Patent No.: US 9,908,712 B2
(45) Date of Patent: Mar. 6, 2018

(54) SYSTEM AND METHOD FOR SERVICING A ROTOR OF A GENERATOR USING A CARRIAGE STEERING DEVICE

(71) Applicant: Siemens Energy, Inc., Orlando, FL (US)

(72) Inventors: James B. Edwards, Sanford, FL (US); William T. Donovan, Jackonsville, FL (US); Cezar Cisloiu, Monroeville, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 113 days.

(21) Appl. No.: 14/933,167

(22) Filed: Nov. 5, 2015

(65) Prior Publication Data
US 2017/0129712 A1    May 11, 2017

(51) Int. Cl.
| | |
|---|---|
| *B65G 35/06* | (2006.01) |
| *F01D 25/28* | (2006.01) |
| *H02K 15/00* | (2006.01) |
| *B25B 11/00* | (2006.01) |

(52) U.S. Cl.
CPC .............. *B65G 35/06* (2013.01); *B25B 11/00* (2013.01); *F01D 25/285* (2013.01); *H02K 15/0006* (2013.01); *B65G 2201/0223* (2013.01)

(58) Field of Classification Search
None
See application file for complete search history.

(56) References Cited

U.S. PATENT DOCUMENTS

| | | | |
|---|---|---|---|
| 4,157,613 A | 6/1979 | Morrow | |
| 8,056,701 B2 * | 11/2011 | Sugimoto | B61B 13/127 187/211 |
| 2010/0131015 A1 * | 5/2010 | Kozak | G02B 7/1825 606/301 |
| 2010/0154201 A1 | 6/2010 | Pervaiz | |
| 2015/0337685 A1 * | 11/2015 | Golubic | F01D 25/285 415/214.1 |

FOREIGN PATENT DOCUMENTS

| | | |
|---|---|---|
| DE | 19939207 A1 | 2/2001 |
| EP | 2615728 A1 | 7/2013 |

OTHER PUBLICATIONS

"World Industrial Reporter" website screen capture.*
PCT International Search Report and Written Opinion dated Jan. 2, 2017 corresponding to PCT Application No. PCT/US2016/057269 filed Oct. 17, 2016.

* cited by examiner

*Primary Examiner* — Anna M Momper
*Assistant Examiner* — Ronald P Jarrett

(57) ABSTRACT

A system and method for servicing a rotor of a generator are presented. The system includes a carriage for carrying the rotor. At least one carriage steering device are arranged on the carriage for steering the carriage when traversing along a removal skid during servicing the rotor. The carriage steering device is attached to the carriage in a way that it is accessible from above the carriage. The carriage steering device is adjustable such that a center of the carriage aligns to a center rail of the removal skid when traversing along the removal skid during servicing the rotor.

15 Claims, 4 Drawing Sheets

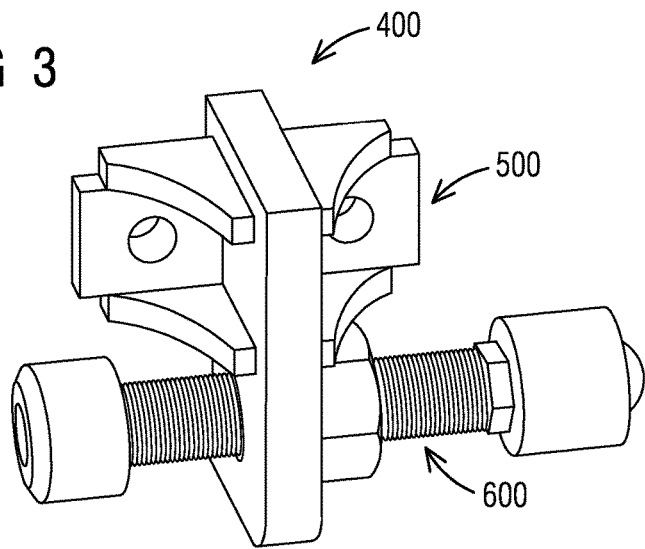
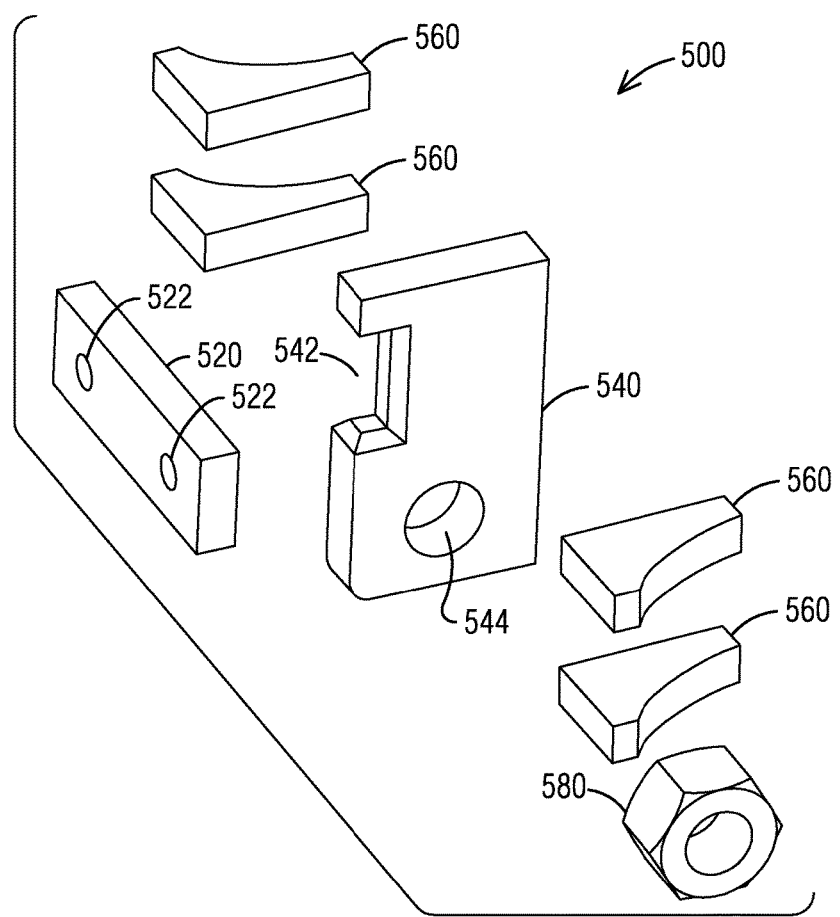

SYSTEM AND METHOD FOR SERVICING A ROTOR OF A GENERATOR USING A CARRIAGE STEERING DEVICE

FIELD

Aspects of the present invention relate to a system and a method for servicing a rotor of a generator, and in particular for a rotor removal or installation.

DESCRIPTION OF RELATED ART

Components of a generator may include a rotor and a stator. Roller carriages may be used for servicing a rotor of a generator, such as removing the rotor from the generator or installing the rotor into the generator. The roller carriages may traverse along a removal skid until the rotor is clear of the generator stator.

The carriages may have a tendency to move laterally as the rotor goes in or out due to a misalignment of the rollers, a misalignment of the removal skid, or a departure from specifications in the removal skid manufacture. The lateral movements of the carriages may cause the rotor to contact and damage the stator. There is a need to adjust the lateral location of the carriages back to the center of the removal skid during servicing the rotor. However, due to the weight of the rotor, it is difficult to move the carriages back to the center of the removal skid.

SUMMARY

Briefly described, aspects of the present invention relate to a system and a method for servicing a rotor of a generator, and in particular for a rotor removal or installation.

According to an aspect, a system for servicing a rotor is presented. The system comprises a removal skid comprising a center rail and side rails. The system further comprises a carriage that is adapted to carry the rotor. The carriage comprises a base plate. The base plate comprises a top surface, a bottom surface, and a plurality of side surfaces. The system further comprises at least one carriage steering device. The at least one steering device is adapted to steer the carriage when traversing along the removal skid during servicing the rotor. The carriage steering device is attached to one of the plurality of side surfaces such that it is accessible from above the carriage. The carriage steering device is adjustable such that a centerline of the carriage aligns to the center rail of the removal skid when traversing along the removal skid during servicing the rotor.

According to another aspect, a method for servicing a rotor is presented. The method comprises carrying a rotor by a carriage. The method further comprises traversing the carriage along a removal skid. The system further comprises steering the carriage by at least one carriage steering device when traversing along the removal skid. The removal skid comprises a center rail and side rails. The carriage comprises a base plate. The base plate comprises a top surface, a bottom surface, and a plurality of side surfaces. The carriage steering device is attached to one of the plurality of side surfaces such that it is accessible from above the carriage. The carriage steering device is adjustable such that a centerline of the carriage aligns to the center rail of the removal skid when traversing along the removal skid during servicing the rotor.

According to yet another alternative aspect, a system for servicing a rotor is presented. The system comprises a removal skid comprising side rails. The system further comprises a carriage that is adapted to carry the rotor. The carriage comprises a base plate. The base plate comprises a top surface, a bottom surface, and a plurality of side surfaces. The system further comprises at least one carriage steering device. The at least one steering device is adapted to steer the carriage when traversing along the removal skid during servicing the rotor. The carriage steering device is attached to one of the plurality of side surfaces such that it is accessible from above the carriage. The carriage steering device is adjustable such that a centerline of the carriage aligns to a center of the removal skid when traversing along the removal skid during servicing the rotor.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings:

FIG. 3 illustrates a perspective view of a carriage steering device according to an embodiment;

FIG. 4 illustrates a perspective explosive view of a carriage steering bracket according to an embodiment;

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
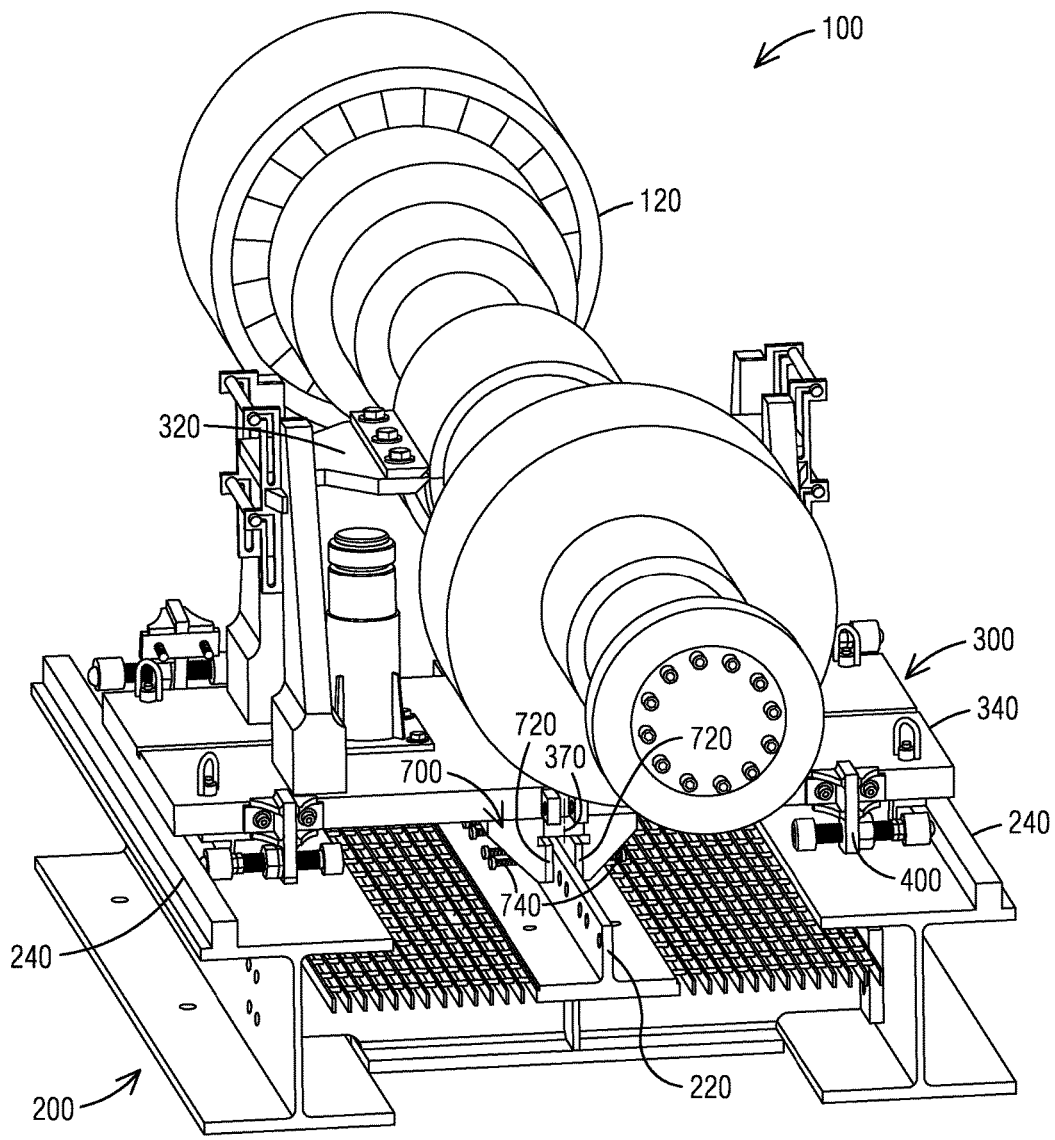
FIG. 1 illustrates a perspective view of a system for servicing a rotor according to an embodiment.

FIG. 1 illustrates a perspective view of a system 100 for servicing a rotor 120 according to an embodiment. According to the illustrated embodiment, the system 100 comprises a removal skid 200. According to the illustrated embodiment, the system 100 comprises a carriage 300 that is adapted to carry the rotor 120. According to the illustrated embodiment, the system 100 comprises at least one carriage steering device 400 that is adapted to steer the carriage 300 when traversing along the removal skid 200 during servicing the rotor 120.

As illustrated in FIG. 1, the removal skid 200 comprises a center rail 220 located at a centerline of the removal skid 200. The removal skid 200 comprises side rails 240 located on either side of the removal skid 200.

The carriage 300 comprises a means 320 for receiving the rotor 120. According to an embodiment as illustrated in FIG. 1, the means 320 for receiving the rotor 120 may be a gantry, for example, a hydraulic gantry. The carriage 300 comprises a base plate 340 which is shown more detail in FIG. 2.

Figure 2:
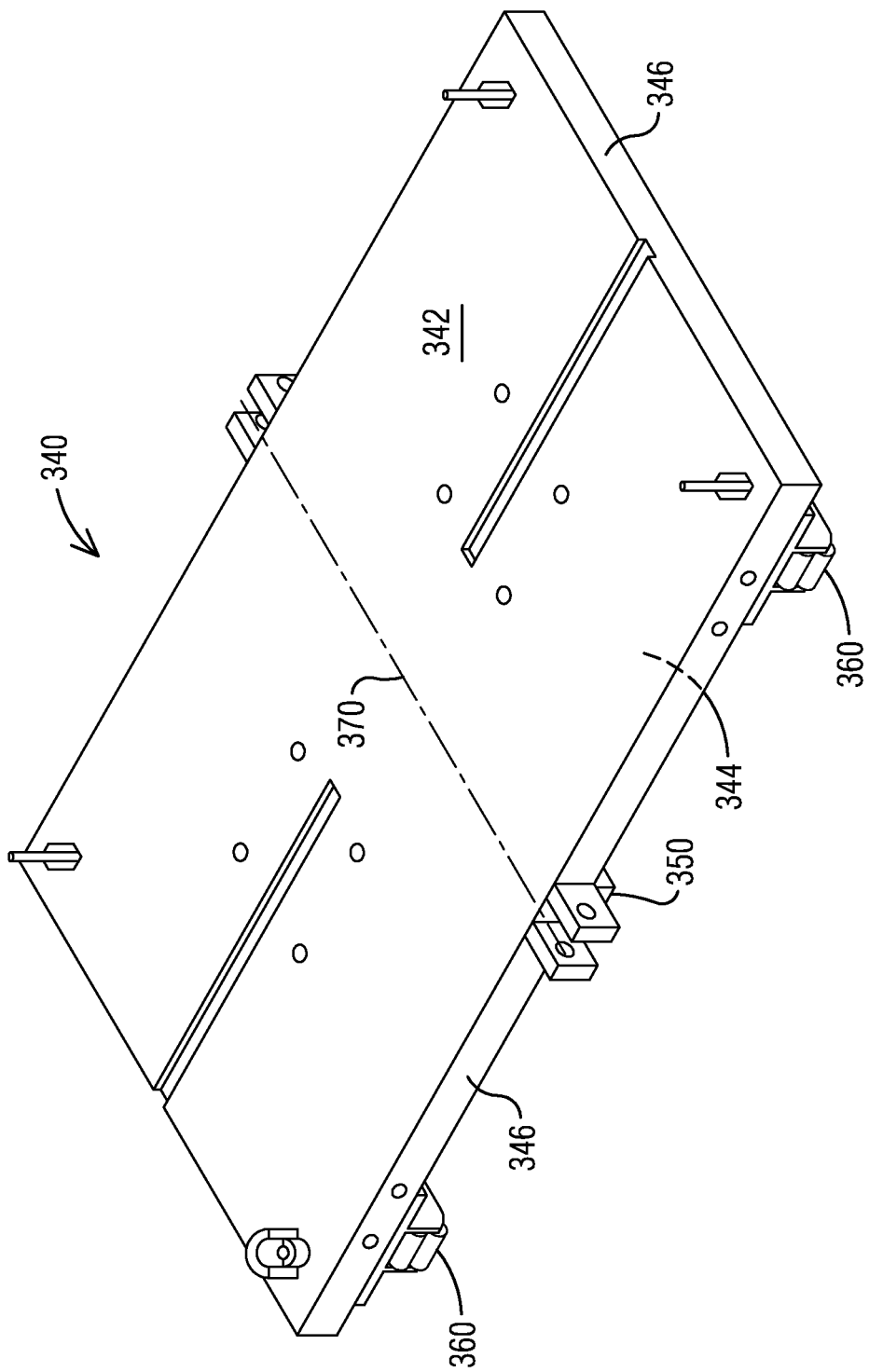
FIG. 2 illustrates a perspective view of a base plate according to an embodiment.

FIG. 2 shows a perspective view of a base plate 340 of a carriage 300 according to an embodiment. As illustrated in FIG. 2, the base plate 340 may be in a rectangular or a square shape. The base plate 340 comprises a top surface 342, a bottom surface 344, and a plurality of side surfaces 346. According to an embodiment, the carriage 300 comprises stiffener bar 350 arranged at the bottom surface 344 of the base plate 340. The stiffener bar 350 may strength the base plate 340 so that it will not deform under load. The carriage 300 comprises means for traversing the carriage 300 along the removal skid 200 during servicing the rotor 120. According to an embodiment, the means for traversing the carriage 300 along the removal skid 200 comprises rollers 360. The rollers 360 may be arranged at the bottom surface 344 of the base plate 340 of the carriage 300.

Referring to FIG. 1, the carriage steering device 400 may be attached to one of the side surfaces 346 of the base plate 340 of the carriage 300 in a way that it is accessible from above the carriage 300. According to an embodiment, the carriage steering device 400 is adapted to adjust a position of the carriage 300 so that a centerline 370 of the carriage 300 aligns with the center rail 220 of the removal skid 200. As illustrated in FIG. 1, the carriage steering device 400 is able to be accessible while the carriage 300 is stationary and moving along the removal skid 200.

FIG. 3 illustrates a perspective view of a carriage steering device 400 according to an embodiment. As shown in FIG. 3, the carriage steering device 400 comprises a carriage steering bracket 500 which are illustrated more details in FIG. 4 and FIG. 5. The carriage steering device 400 comprises an adjustment means 600 which is illustrated more details in FIG. 6.

FIG. 4 illustrates a perspective explosive view of a carriage steering bracket 500 according to an embodiment. The carriage steering bracket 500 comprises a first plate 520. The first plate 520 may be in a rectangular shape. The first plate 520 is adapted to be attached to the side surfaces 346 of the base plate 340 of the carriage 300. According to an embodiment, the first plate 520 comprises apertures 522. The first plate 520 may be bolted onto the side surfaces 346 of the base plate 340 of the carriage 300 via screws through the apertures 522. According to another embodiment, the first plate 520 may be welded onto the side surfaces 346 of the base plate 340 of the carriage 300.

As illustrated in FIG. 4, the carriage steering bracket 500 comprises a second plate 540. The second plate 540 may be in a rectangular shape. According to an embodiment, the first plate 520 and the second plate 540 may be attached with each other perpendicularly. As shown in FIG. 4, the second plate 540 comprises a cutout 542. A height of the cutout 542 may be the same height of the first plate 520. The first plate 520 may be attached onto the second plate 540 through the cutout 542. The second plate 540 may comprises an aperture 544. A nut 580 may be attached around the aperture 544. According to an embodiment, an adjustment means 600 of the carriage steering device 400 may be attached to the second plate 540 of the carriage steering bracket 400 through the nut 580 and the aperture 544.

As illustrated in FIG. 4, the carriage steering bracket 500 comprises a plurality of third plate 560. The third plates 560 may be attached at intersection regions between the first plate 520 and the second plate 540. Each of the third plates 560 comprises two perpendicular side surfaces that extend along the first plate 520 and the second plate 540 respectively. According to an embodiment, the third plates 560 may be gussets.

Figure 5:
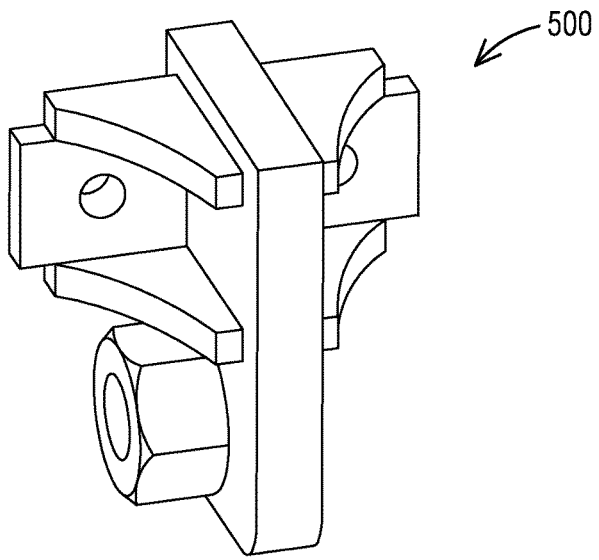
FIG. 5 illustrates a perspective view of a carriage steering bracket according to an embodiment

FIG. 5 illustrates a perspective view of a carriage steering bracket 500 according to an embodiment. As shown in FIG. 5, the first plate 520, the second plate 540, the third plates 560, and the nut 580 may be attached together into one piece to form the carriage steering bracket 500, for example, by welding.

Figure 6:
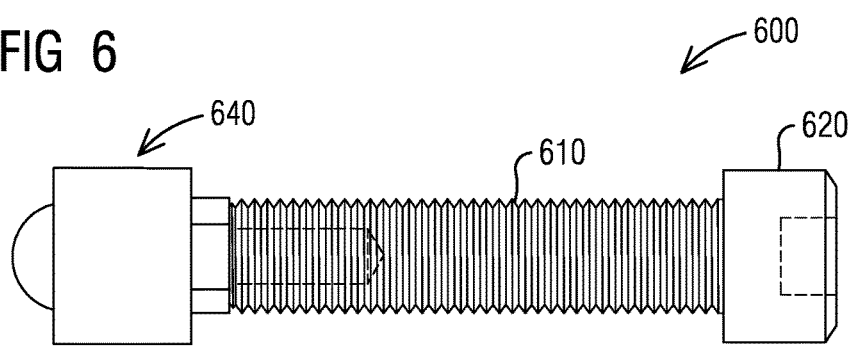
FIG. 6 illustrates a perspective view of an adjustment means according to an embodiment.

FIG. 6 illustrates a perspective view of an adjustment means 600 according to an embodiment. The adjustment means 600 comprises a threaded cylindrical body 610. A cap 620 may be attached to one end of the threaded cylindrical body 610. A rolling device 640 may be attached to another end of the threaded cylindrical body 610. According to an embodiment, the adjustment means 600 comprises a cap screw.

Figure 7:
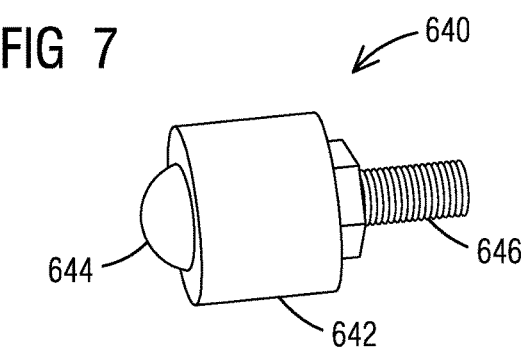
FIG. 7 illustrates a perspective view of a rolling device according to an embodiment.

FIG. 7 illustrates a perspective view of a rolling device 640 according to an embodiment. The rolling device 640 comprises a main body 642. As illustrated in FIG. 7, the main body 642 may be a cylinder. The rolling device 640 comprises a roller 644. The roller 644 may be arranged at one end of the main body 642. The roller 644 may be in a sphere shape. The roller 644 may freely rotate within the main body 642. As illustrated in FIG. 7, the rolling device 640 comprises a threaded cylindrical body 646. The threaded cylindrical body 646 may be arranged at another end of the main body 642. According to an embodiment as illustrated in FIG. 6, the threaded cylindrical body 646 of the rolling device 640 may be seated and torqued inside the cylindrical body 610 of the adjustment means 600.

According to an embodiment, the carriage steering device 400 may be attached to one of the side surfaces 346 of the base plate 340 of the carriage 300 such that the adjustment means 600 is at an elevation of the side rails 240 of the removal skid 200. Such arrangement may enable the adjustment means 600 to be accessible from a safe position adjacent to the carriage 300.

Referring to FIG. 1, a plurality of carriage steering devices 400 may be attached to corners of the side surfaces 346 of the base plate 340 adjacent to the side rails 240 of the removal skid respectively. Rolling devices 640 of the carriage steering devices 400 may be arranged facing toward the adjacent side rails 240 of the removal skid 200 respectively.

According to an embodiment, the rolling device 640 of the carriage steering device 400 may be set to a clearance from each of the side rails 240 adjacent to it so that the carriage 300 may move easily along the removal skid 200 during servicing a rotor 120. The clearance may be set to about ⅛ inch from each of the side rails 240. The carriage 300 may move laterally to one or another side rail 240 during servicing a rotor 120. One of the carriage steering devices 400 may contact the side rail 240 adjacent to it due to the lateral movement. The side rail 240 contacting the carriage steering device 400 may stop further lateral movement of the carriage 300.

According to an embodiment, the roller 644 may freely rotate within the main body 642. Free rotation of the roller 644 within the main body 642 may reduce a friction between the carriage steering device 400 and the side rail 240 being contacted due to a lateral movement of the carriage 300. Free rotation of the roller 644 within the main body 642 may keep the side rail 240 from being scored so that the side rail 240 may stay smooth and minimize friction on the rolling device 640.

According to an embodiment, the threaded adjustment means 600 may allow a fine and controllable lateral position adjustment of the carriage 300 during servicing a rotor 120. A more precise alignment between a centerline 370 of the carriage 300 and the center rail 220 of the removal skid 200 may be achieved. The threaded adjustment means 600 may allow a greater lateral pressure against the side rails 240 of the removal skid 200.

Referring to FIG. 1, a center track guide 700 may be attached to the bottom surface 344 of the base plate 340 of the carriage 300. The center track guide 700 comprises side plates 720. The side plates 720 may be arranged on each side of the center rail 220 of the removal skid 200. The side plates 720 may be set to a clearance to each side of the center rail 220. The side plates 720 may be adjustable using adjustment screws 740 to sandwich the center rail 220 between them. The center track guide 700 may keep the carriage 300 from a lateral movement during servicing a rotor 120. The center track guide 700 may be used to adjust a lateral position of the carriage 300. However, a lateral position adjustment of the carriage 300 using the center track guide 700 can only be done while the carriage 300 is in stationary since the adjustment screws 740 are located underneath the carriage 300.

According to an embodiment, the carriage steering device 400 may be attached to one of the side surfaces 346 of the base plate 340 of the carriage 300 so that it is accessible from above the carriage 300. The inventive arrangement of the carriage steering device 400 may allow a lateral position adjustment of the carriage 300 while the carriage 300 is stationary and while moving along the removal skid 200 during servicing a rotor 120.

The illustrated system and method may allow personnel to access the carriage steering device 400 from a safe position adjacent to the carriage 300. The inventive system may reduce a potential for personnel injury during servicing a rotor 120.

The illustrated system and method may allow personnel to adjust a lateral position of the carriage 300 during servicing a rotor 120 using a hand tool. Personnel may turn the adjustment means 600 to a controllable distance using a hand tool to keep a precise alignment between a centerline 370 of the carriage 300 and the center rail 220 of the removal skid 200.

The illustrated system and method uses the carriage steering device 400 reacting against the side rails 240 of the removal skid 200 to adjust a lateral position of the carriage 300 during servicing a rotor. The illustrated system and method may eliminate using a steel wedge driven with hammer between the rollers 360 of the carriage 300 and the side rails 240 of the removal skid 200 to reposition a lateral position of the carriage 300. The illustrated system and method may eliminate using a Johnson bar to pry the carriage 300 in a desired lateral position using the rollers 360 of the carriage 300 and the side rails 240 of the removal skid 200. The illustrated system and method may not cause a damage of the rollers 360 of the carriage 300.

The disclosed system and method may increase a control of a lateral position adjustment of a carriage 300 during removal or insertion of generator rotors. The disclosed system and method may reduce a risk of damaging generator stators and rotors during removal or insertion of rotors. The disclosed system and method may reduce a cost of repairing damages of generator stators and rotors.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 System for Servicing a Rotor
120 Rotor
200 Removal Skid
220 Center Rail of the Removal Skid
240 Side Rail of the Removal Skid
300 Carriage
320 Gantry
340 Base Plate of the Carriage
342 Top Surface of the Base Plate
344 Bottom Surface of the Base Plate
346 Side Surface of the Base Plate
350 Stiffener Bar of the Base Plate
360 Roller of the Carriage
370 Centerline of the Carriage
400 Carriage Steering Device
500 Carriage Steering Bracket
520 First Plate of the Carriage Steering Bracket
522 Aperture of the First Plate
540 Second Plate of the Carriage Steering Bracket
542 Cutout of the Second Plate
544 Aperture of the Second Plate
560 Third Plate of the Carriage Steering Bracket
580 Nut of the Carriage Steering Bracket
600 Adjustment Means of the Carriage Steering Device
610 Threaded Cylindrical Body of the Adjustment Means
620 Cap of the Adjustment Means
640 Rolling Device of the Adjustment Means
642 Main Body of the Rolling Device
644 Roller of the Rolling Device
646 Threaded Cylindrical Body of the Rolling Device
700 Center Track Guide
720 Side Plate of the Center Track Guide
740 Screw of the Center Track Guide

What is claimed is:

1. A system for servicing a rotor comprising:
a removal skid comprising a center rail and side rails;
a carriage comprising a base plate adapted to carry the rotor, wherein the base plate comprises a top surface, a bottom surface, and a plurality of side surfaces;
carriage steering bracket attached to one of the plurality of side surfaces of the base plate; and
a screw attached to the carriage steering bracket such that it is accessible from above the carriage and is adapted to adjust the carriage such that a center of the carriage aligns to the center rail of the removal skid when traversing along the removal skid during servicing the rotor,
wherein the carriage steering bracket comprises a first plate and a second plate,
wherein the first plate is attached to the side surface of the base plate, and wherein the second plate is attached to the first plate perpendicularly.

2. The system as claimed in claim 1, wherein the second plate comprises an aperture, and wherein the screw is attached to the second plate through the aperture.

3. The system as claimed in claim 1, further comprising a threaded cylinder mounted on an end of the screw and adapted to be seated inside the screw.

4. The system as claimed in claim 3, further comprising a main body and a roller, wherein the roller is attached to one side of the main body, and wherein the threaded cylinder is attached to another side of the main body.

5. The system as claimed in claim 4, further comprising a plurality of steering brackets, wherein each of the plurality of steering brackets is attached to a corner of one of the side surfaces such that the roller is facing towards the side rail.

6. The system as claimed in claim 1, wherein the carriage steering bracket is bolted onto the one of the side surfaces of the base plate.

7. The system as claimed in claim 1, wherein the carriage steering bracket is welded onto the one of the side surfaces of the base plate.

8. The system as claimed in claim 1, wherein the second plate comprises a cutout, and wherein the first plate and the second plate are attached together through the cutout.

9. A method for servicing a rotor comprising:
carrying a rotor by a carriage;
traversing the carriage along a rotor removal skid; and
adjusting the carriage by a screw such that a center of the carriage aligns to the center rail of the removal skid when traversing along the rotor removal skid,
wherein the removal skid comprises a center rail and side rails,
wherein the carriage comprising a base plate having a top surface, a bottom surface, and a plurality of side surfaces,
wherein the screw is attached to a carriage steering bracket,
wherein the carriage steering bracket is attached to one of the plurality of side surfaces of the base plate such that the screw is accessible from above the carriage,
wherein the carriage steering bracket comprises a first plate and a second plate,
wherein the first plate is attached to the side surface of the base plate, and
wherein the second plate is attached to the first plate perpendicularly.

10. The method as claimed in claim 9, wherein the second plate comprises an aperture, and wherein the screw is attached to the second plate through the aperture.

11. The method as claimed in claim 1, wherein a threaded cylinder is mounted on an end of the screw and is adapted to be seated inside the screw.

12. The method as claimed in claim 11, wherein a roller is attached to one side of a main body, and wherein the threaded cylinder is attached to another side of the main body.

13. The method as claimed in claim 12, wherein a plurality of steering brackets are each attached to a corner of one of the side surfaces respectively such that the rollers are facing towards the side rail.

14. The method as claimed in claim 9, wherein the carriage steering bracket is bolted or welded onto the one of the side surfaces of the base plate.

15. A system for servicing a rotor comprising:
a removal skid comprising side rails;
a carriage comprising a base plate adapted to carry the rotor, wherein the base plate comprises a top surface, a bottom surface, and a plurality of side surfaces; and
at least one carriage steering bracket attached to one of the plurality of side surfaces of the base plate;
a screw attached to the carriage steering bracket such that it is accessible from above the carriage and is adapted to adjust the carriage such that a center of the carriage aligns to a center of the removal skid when traversing along the removal skid during servicing the rotor,
wherein the carriage steering bracket comprises a first plate and a second plate,
wherein the first plate is attached to the side surface of the base plate, and
wherein the second plate is attached to the first plate perpendicularly.

* * * * *